(12) United States Patent
Segal et al.

(10) Patent No.: US 6,536,129 B2
(45) Date of Patent: Mar. 25, 2003

(54) CENTERING DEVICE FOR A SAW BLADE

(75) Inventors: John M. Segal, Jasper, IN (US); Russell E. Neukam, Jasper, IN (US)

(73) Assignee: North American Products Corp., Jasper, IN (US)

( * ) Notice: Subject to any disclaimer, the term of this patent is extended or adjusted under 35 U.S.C. 154(b) by 0 days.

(21) Appl. No.: 09/944,557

(22) Filed: Aug. 31, 2001

(65) Prior Publication Data

US 2002/0078584 A1 Jun. 27, 2002

Related U.S. Application Data

(63) Continuation-in-part of application No. 09/301,041, filed on Apr. 28, 1999, now Pat. No. 6,298,573.

(51) Int. Cl.$^7$ .............................................. B23D 47/02
(52) U.S. Cl. ............................. 33/644; 33/633; 33/642; 83/666; 76/79
(58) Field of Search ........................ 33/633, 613, 520, 33/626, 628, 634, 643, 644, 642, 632, 640, 641, 671, 672, 673; 269/48.1, 50, 51, 88, 2.01; 33/1 M, 706, 707, 708; 76/73, 79, 79.5, 78.1; 83/666, 835, 698.11

(56) References Cited

U.S. PATENT DOCUMENTS

| | | |
|---|---|---|
| 29,375 A | 7/1860 | Hinman |
| 143,447 A * | 10/1873 | Grimes ........................... 76/73 |
| 522,651 A | 7/1894 | Cole |
| 575,469 A | 1/1897 | Fancher |
| 1,336,311 A | 4/1920 | Martin |
| 1,399,969 A * | 12/1921 | Kurkhan ....................... 142/55 |
| 1,616,150 A * | 2/1927 | Teller et al. ................... 408/41 |
| 1,846,787 A | 2/1932 | Buchmuller |
| 1,937,261 A * | 11/1933 | Billingsley ...................... 76/73 |
| 2,135,891 A * | 11/1938 | Gommel ......................... 76/73 |
| 2,290,731 A | 7/1942 | Blazek |
| 2,541,605 A * | 2/1951 | Ohlsson ....................... 269/266 |
| 2,546,520 A * | 3/1951 | Potter et al. ................... 82/147 |
| 2,972,266 A * | 2/1961 | McEwan ......................... 76/79 |
| 3,156,480 A | 11/1962 | Wuesthoff |
| 3,221,787 A | 5/1963 | Hitt |
| 3,204,493 A | 9/1965 | Severdia ....................... 408/97 |
| 3,762,057 A | 10/1973 | Kaifesh ........................ 33/294 |
| 3,783,729 A * | 1/1974 | Parr ............................ 83/666 |
| 4,034,786 A | 7/1977 | Feldmann et al. ............. 157/18 |
| 5,052,254 A | 10/1991 | Goins ........................... 82/152 |
| 5,069,096 A | 12/1991 | Desrosiers .................... 82/151 |
| 5,556,085 A | 9/1996 | Cyr ............................. 269/156 |
| 5,848,479 A | 12/1998 | MacIndoe .................... 33/542 |
| 6,164,634 A * | 12/2000 | Farlow ......................... 269/47 |
| 6,298,573 B1 * | 10/2001 | Segal et al. ................... 33/640 |
| 6,314,656 B1 * | 11/2001 | Morel et al. .................. 33/644 |

* cited by examiner

Primary Examiner—Diego Gutierrez
Assistant Examiner—R. Alexander Smith
(74) Attorney, Agent, or Firm—Barnes & Thornburg

(57) ABSTRACT

A device for centering tools, such as saw blades, rotary cutters and the like which are circular and which have bores of different sizes, on processing machines such that they can be positioned about their center axes. The device includes a mount adapted to be attached to such a machine, and a slide coupled to the mount and adapted to move relative to the mount. A first bearing is coupled to the mount, and a second and third bearing are coupled to the slide and mounted for movement on the slide selectively toward or away from the first bearing. The first, second and third bearings are configured to engage the bore of the blade such that the bore is centered on the machine and the blade is rotatable about its center axis.

17 Claims, 5 Drawing Sheets

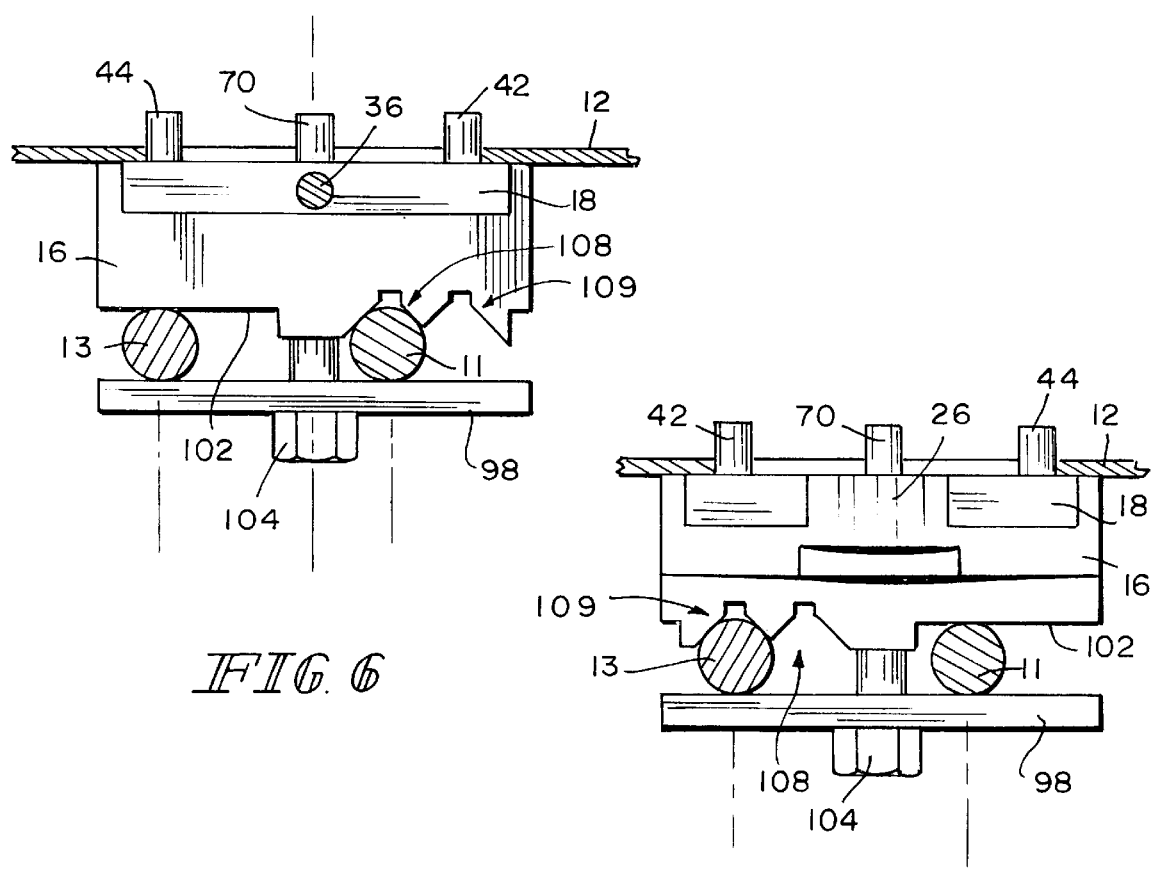

CENTERING DEVICE FOR A SAW BLADE

This application is a continuation in part of U.S. patent application Ser. No. 09/301,041, filed Apr. 28, 1999, now U.S. Pat. No. 6,298,573.

BACKGROUND AND SUMMARY OF THE INVENTION

The present invention relates to a device for centering tools, such as saw blades, rotary cutters and the like which are circular and which have bores of different sizes, on processing machines such that they can be positioned about their center axes.

It is well known in the art that cutting tools such as industrial saw blades are provided with center bores (openings) having a variety of sizes. In order to sharpen such tools, it is necessary to position them on machines like grinders such that they are rotatable about their true center axes. This is commonly handled in shops that process (sharpen) such saw blades by providing, with each machine, a rather large quantity of bushings for selective trial in the saw blade to be finished. While this approach is commonly used, it is difficult and time consuming to find the right bushing to center each saw blade brought to the machine.

Some machinists have provided rather complex mechanisms comprising three jaws and a mechanism for moving the jaws radially outwardly and inwardly selectively to fit a blade. These mechanisms, however, are rather complex and are difficult to use for a wide range of bore sizes.

The device of the present invention is primarily concerned with centering saw blades having different bore sizes on a processing machine. According to other features, characteristics, embodiments and alternatives of the present invention which will become apparent as the description thereof proceeds below, the present invention provides a device for centering tools, such as saw blades, rotary cutters and the like which are circular and which have bores of different sizes, on processing machines such that they can be positioned about their center axes.

According to the illustrative embodiment of the disclosure, a centering device is provided for centering a circular cutting tool on a processing machine such as a saw blade grinder. The device comprises a mount adapted to be attached to the machine, a slide coupled to the mount and configured for movement relative to the mount, a first bearing mounted on the mount, and a second and a third bearing mounted on the slide for movement with the slide selectively toward and away from the first bearing. The slide and mount cooperate to support the tool and to present the tool to a processing element. The first, second and third bearings are engagable with the bore of the tool to cause the tool to be centered on the machine when the second and third bearings are moved from the first bearing securely pulling the tool bore against the first, second and third bearings, whereby the tool is then rotatable about its center axis. Each tooth of the saw blade can then be presented to a grinding wheel or other cutting device such that each tooth will be finished relative to the true center of the blade. An adjuster is also provided that is configured to move the slide selectively toward and away from the first bearing mounted on the mount.

A method of centering a tool on a machine is further disclosed. The method comprises the steps of providing a mount configured for coupling with a processing machine, providing a bearing on the mount, and providing a slide having a first row and a second row of holes. The slide is configured to move relative to the mount. The method further comprises the steps of positioning the tool on the mount and slide such that the bore engages the bearing and at least one hole from each row of holes is visible through the bore, placing a pin carrying a second bearing in an outermost visible hole of the first row, placing a pin carrying a third bearing in an outermost visible hole of the second row, and moving the slide relative to the mount such that the first, second, and third bearings engage and hold the bore of the tool.

Additional features of the invention will become apparent to those skilled in the art upon consideration of the following detailed description of preferred embodiments exemplifying the best mode of carrying out the invention as presently perceived.

BRIEF DESCRIPTION OF DRAWINGS

The present invention will be described hereafter with reference to the attached drawings which are given as non-limiting examples only, in which:

FIG. 6 is a view taken along the line 6—6 of FIG. 3, wherein the centering device is mounted such that a rod engages the inner-most angled recess of the bottom of the mount; and FIG. 7 is a view taken along the line 7—7 of FIG. 5, wherein the centering device has been turned 180 degrees from the view of FIG. 6, and the centering device has been mounted such that a rod engages the outer-most angled recess of the bottom of the mount.

Corresponding reference characters indicate corresponding parts throughout the several views. The exemplification set out herein illustrates a preferred embodiment of the invention, in one form, and such exemplification is not to be construed as limiting the scope of the invention in any manner.

DETAILED DESCRIPTION OF THE INVENTION

The present invention relates to centering devices, such as those disclosed in U.S. patent application Ser. No. 09/301, 041, incorporated herein by reference.

The present invention is directed to a centering device 10 which is proportioned and designed to be mounted on a machine for processing circular tools such as saw blades having center bores. Such a machine may be, for example, a grinder used to sharpen industrial saw blades. Such grinders typically comprise a support upon which a saw blade is placed and indexed about its axis on a bushing such that each tooth can be sharpened or otherwise finished. Such machines typically have a single upwardly or outwardly extending bearing post although industrial saw blades are provided with a wide variety of bore diameters ranging from, for example, 1 inch up to 5.5 inches in diameter. Each such machine is typically provided with a plurality of bushings having an inner diameter which will fit the bearing post on the machine and a wide range of outer diameters which will fit typical bore diameters in saw blades. It will be appreciated that the operator of the machine must sort through a multitude of bushings to find an appropriate bushing. Quite often, for individual saw blades, a separate bushing will have to be made at some considerable time and expense. It will also be appreciated that some machines have horizontal (upwardly facing) work surfaces such that the blades are horizontally oriented. Conversely, other machines have vertically (laterally facing) work surfaces such that the blades are vertically oriented.

Figure 1:
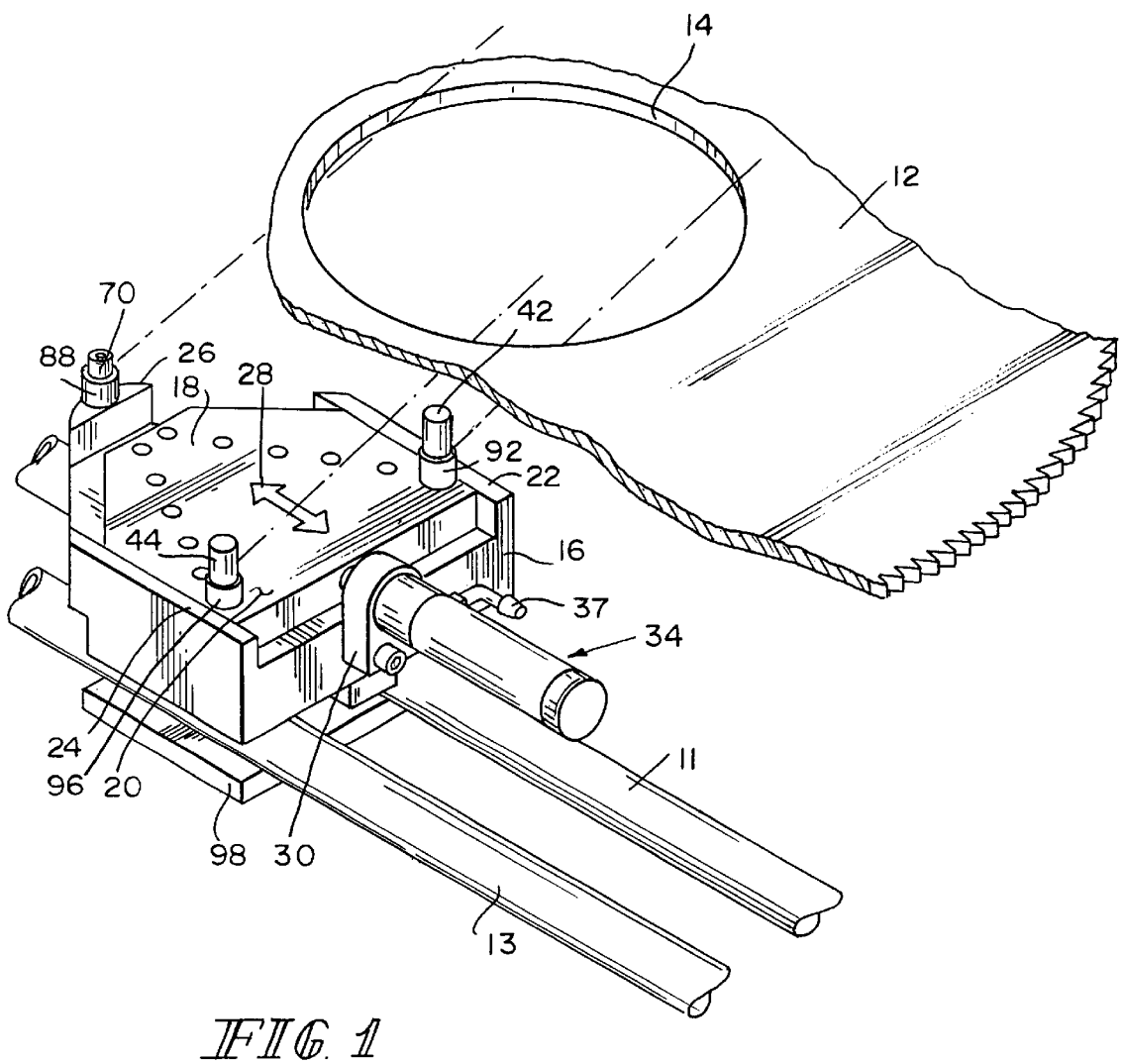
FIG. 1 is a perspective assembled view of a centering device according to the present invention, showing a mount having a movable slide coupled therewith, the mount and slide being configured to carry a blade and support the blade for rotational movement about three bearings.
Figure 2:
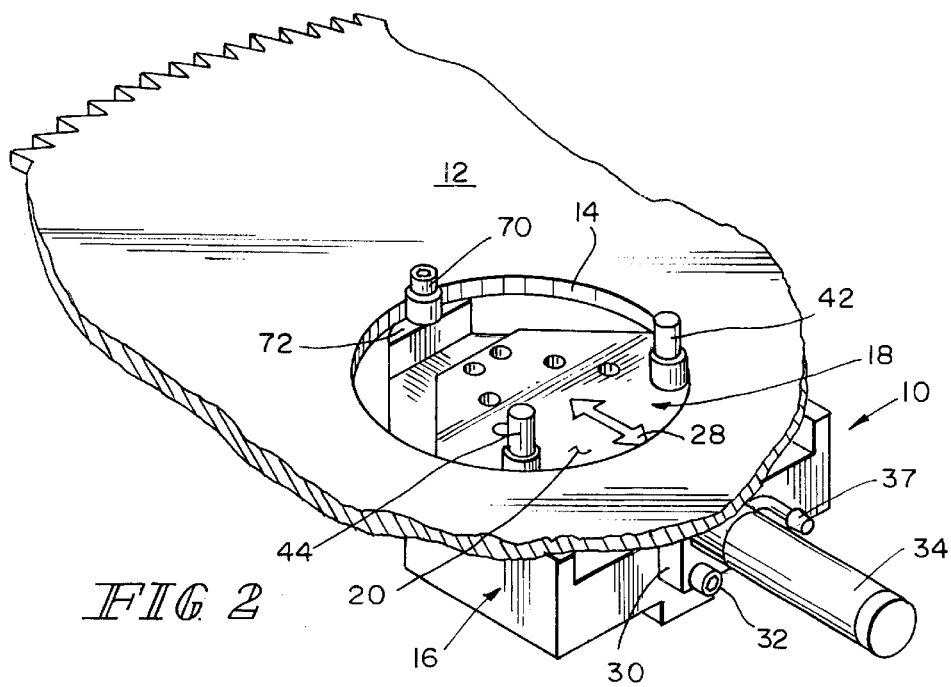
FIG. 2 is a perspective view similar to FIG. 1 showing the blade mounted on the mount and slide, the mount carrying a first bearing and the slide carrying second and third bearings.
Figure 3:
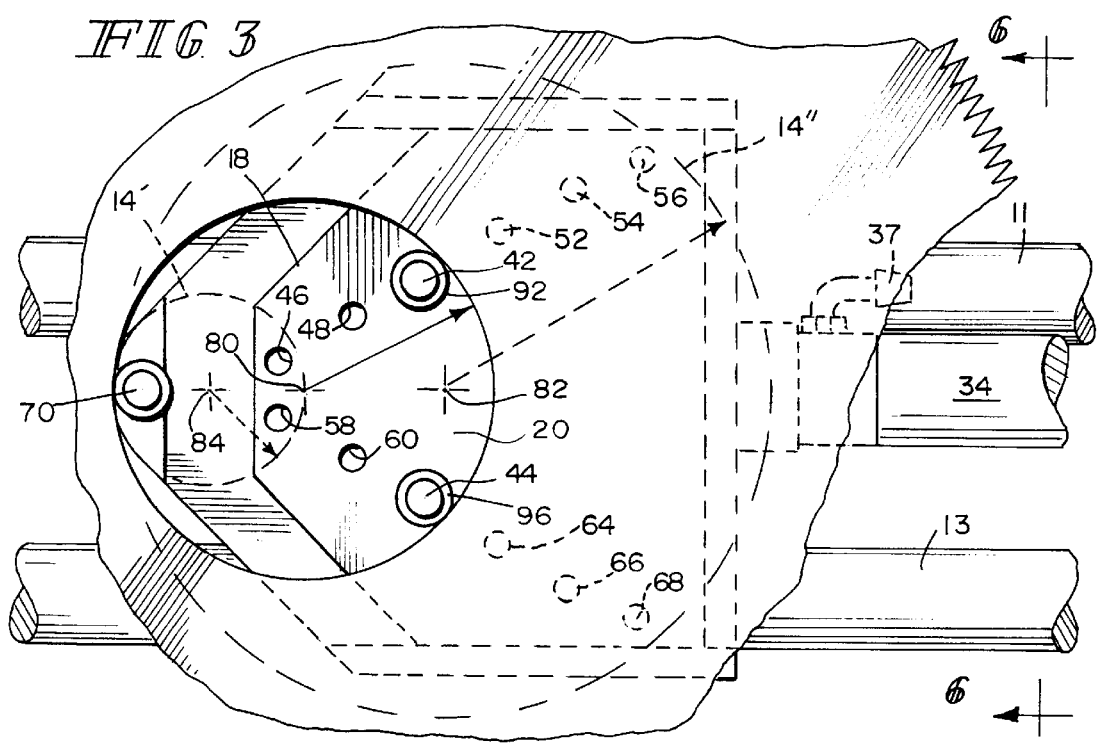
FIG. 3 is a top view of the centering device of FIGS. 1 and 2.

Centering device 10, shown in FIGS. 1–7, is provided to replace the multitude of bushings. Centering device 10 engages a blade 12 at its bore 14, as shown in FIGS. 1–3. Centering device 10 includes a mount 16 configured for mounting on a machine, such as a grinding machine. Illustratively, centering device 10 is configured for mounting on an Akemat grinding machine, available from AKE Knebel, of Balingen, Germany. It should be understood that the disclosed centering device can be configured for other machines and particularly saw grinding machines by modifying the bottom of the mount to couple with such machine accordingly.

Centering device 10 is shown in FIG. 1 positioned to receive a blade 12 at its bore 14 such that blade 12 is mounted on centering device 10 as shown in FIGS. 2–3. Bore 14 may be dimensioned substantially as shown in FIG. 3, or may be a smaller sized bore 14' or a larger sized bore 14", as shown in phantom in FIG. 3.

Figure 4:
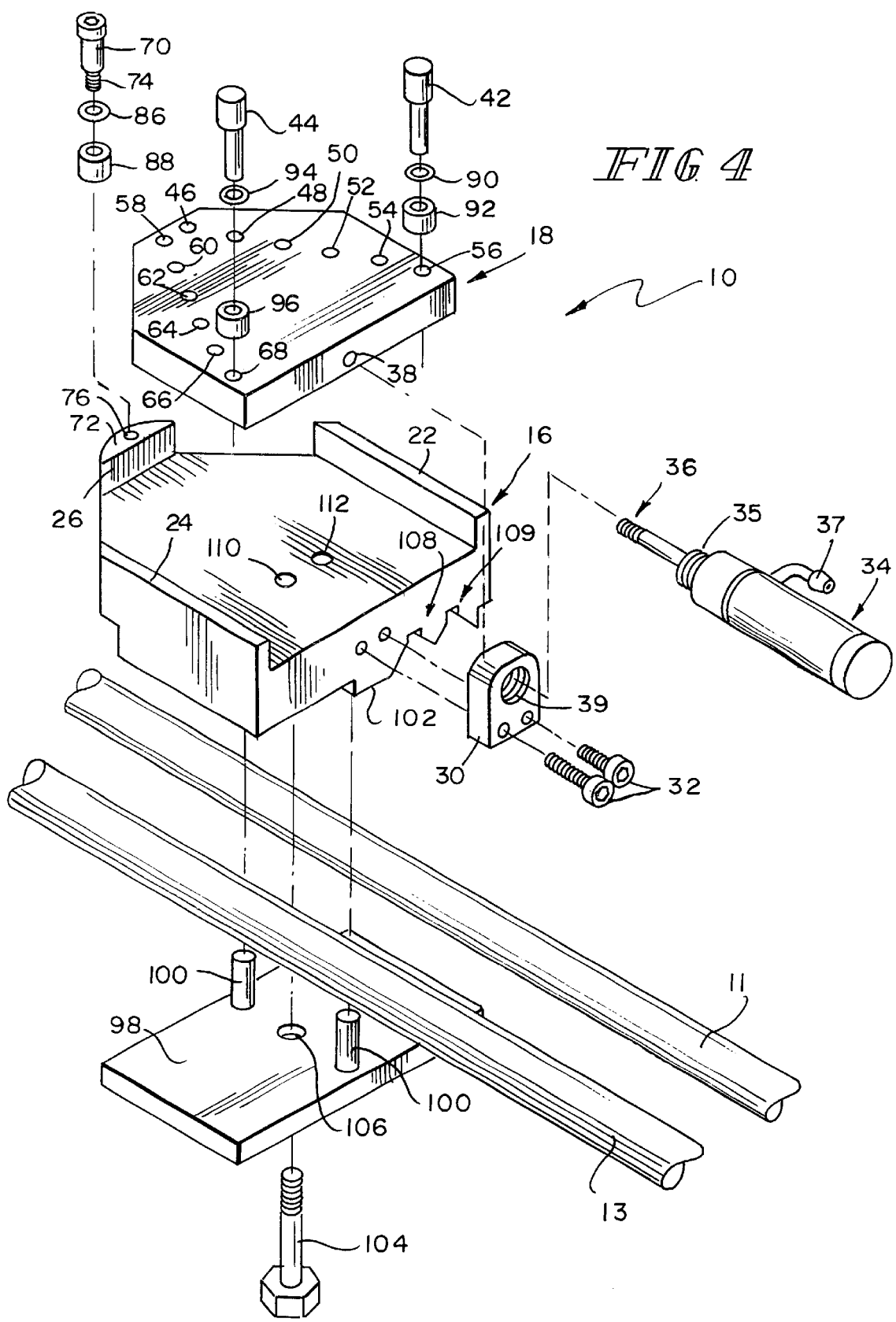
FIG. 4 is an assembly view of the centering device, showing the device being mounted to rods which are used in presenting the blade to be processed.

Illustratively, an Akemat grinding machine includes a pair of spaced apart, parallel rods 11, 13, onto which mount 16 is mounted, as shown in FIGS. 1, 3, and 4. As illustrated in assembly view in FIG. 4, centering device 10 includes a plate 98 having a pair of dowel pins 100 for insertion into holes (not shown) bored in bottom 102 of mount 16. A fastener 104 is also provided and inserted through aperture 106 formed in plate 98. Fastener 104 threads into a counter bore hole (not shown) in bottom 102 of mount 16, thereby securing rods 11, 13 between plate 98 and bottom 102, as shown in FIGS. 1, 3, and 5–7.

Mount 16 includes guide walls 22, 24, and a nose 26, as shown in FIGS. 1 and 4. Walls 22, 24 position and guide a slide 18 for movement relative to mount 16 in the directions indicated by arrows 28. Slide 18 is configured to move relative to mount 16, and surface 20 of slide 18 becomes a part of the support surface upon which blade 12 rests. Nose 26 extends from mount 16 and bounds one end of the sliding movement of slide 18. Sliding movement of slide 18 is bounded on the other end by retainer 30, which is secured to mount 16 with fasteners 32. Retainer 30 defines a threaded aperture 39.

Sleeve 35 of adjuster 34 mates with aperture 39 of retainer 30, as shown in exploded view in FIG. 4. Threaded end 36 of adjuster 34 is further configured to mate with threaded bore 38 of slide 18. When sleeve 35 is mated with retainer 30 and threaded end 36 is mated with threaded bore 38, adjuster 34 controls the positioning of slide 18 relative to mount 16.

Illustratively, adjuster 34 is a pneumatic piston for controlling the positioning of slide 18 relative to mount 16 in response to a pressurized gas. Nozzle 37 of adjuster 34 is pneumatically coupled to a pressurized gas source (not shown), which operates to pressurize piston 34, thereby axially extending threaded end 36 away from adjuster 34. Piston 34 can also be depressurized, such that threaded end 36 retracts axially into adjuster 34. Such axial extension and retraction movement causes slide 18 to move respectively either away from or toward retainer 30, as indicated by arrows 28. Because retainer 30 is in turn supported by mount 16, the extension and retraction movement causes slide 18 to move relative to mount 16.

A fixed dowel pin 70 is mounted on top surface 72 of nose 26. Illustratively, fixed pin 70 has a threaded shaft 74 which engages threaded hole 76. Shaft 74 of fixed pin 70 is inserted through washer 86 and bearing 88 prior to engagement with threaded hole 76, as shown in FIG. 4.

Adjustable dowel pins 42, 44 cooperate with fixed dowel pin 70 to cause bearings 88, 92, 96 to engage an inner surface 78 of bore 14 of blade 12, as shown in FIGS. 1–3 and 5. Adjustable dowel pins are selectively positioned in holes bored in slide 18 such that bearings 92, 96, carried by dowel pins 42, 44, respectively, are sufficiently spaced from fixed pin 70 to engage the inner surface 78 of whatever diameter of bore 14 is provided. Dowel pin 42 is selectively positioned in one of dowel holes 46, 48, 50, 52, 54, 56, while dowel pin 44 is selectively positioned in one of corresponding dowel holes 58, 60, 62, 64, 66, 68. Although the illustrated embodiment utilizes two adjustable dowel pins 42, 44, it is also within the scope of the disclosure to utilize only one adjustable dowel pin (not shown), or any other number of adjustable dowel pins cooperating with bearings.

Upon being mounted, centering device 10 is operated substantially as follows. Slide 18 is moved away from retainer 30 by actuating adjuster 34 with pneumatic pressure directed through nozzle 37. As slide 18 moves away from retainer 30, it carries adjustable dowel pins 42, 44 toward fixed dowel pin 70. Blade 12 is positioned to lie on top surface 20 of slide 18, and simultaneously on top surface 72 of nose 26 such that bearing 88 of fixed dowel pin 70 is proximate to or engaging inner surface 78 of bore 14, substantially as shown in FIGS. 2–3.

Adjustable dowel pin 42 is selectively inserted in one of dowel holes 46, 48, 50, 52, 54, 56, and adjustable dowel pin 44 is selectively inserted in one of corresponding dowel holes 58, 60, 62, 64, 66, 68 such that dowel pins 42, 44 move to engage bore 14 when adjuster 34 moves slide 18 back toward retainer 30. Adjuster 34 moves slide 18 toward retainer 30 by the application of negative pneumatic pressure through nozzle 37.

For example, if bore 14 is dimensioned such that dowel pin 42 is ideally placed in dowel hole 50, as is shown in FIG. 3, dowel pin 44 is respectively placed in dowel hole 62 such that bearings 92, 96 are positioned to simultaneously exert pressure on the inner surface 78 of bore 14 when slide 18 is tightened via adjuster 34 such that bore 14 is in contact with bearing 88 of fixed pin 70 and bearings 92, 96 of adjustable pins 42, 44.

Various radii for bore 14, 14', and 14" are shown in FIG. 3. If bore 14 is dimensioned as shown, centerpoint 80 is positioned such that inner surface 78 contacts bearing 88 of fixed pin 70, while adjustable pins 42, 44 are positioned in dowel holes 50 and 62, respectively, such that bearings 92, 96 are in contact with inner surface 78 when adjuster 34 is tightened. Similarly, a smaller radius for bore 14' (shown in dotted lines) is accommodated by placing adjustable pins 42, 44 in dowel holes 46, 58, respectively and positioning centerpoint 84 as shown. Further illustratively, a larger radius for bore 14" is accommodated by placing adjustable pins 42, 44 is dowel holes 56, 68, respectively, and positioning centerpoint 82 as shown in FIG. 12.

Blade 12 is mounted and ready for use when adjuster 34 has moved slide 18 such that the respective bearings 88, 92, 96 on fixed pin 70 and adjustable pins 42, 44 engage inner surface 78 of bore 14, thereby holding blade 12 in position, as shown in FIG. 2.

Illustratively, blade 12 is presented to the Akemat machine in a fashion that allows blade 12 to rotate about its centerpoint 80 by rolling contact with bearings 88, 92, 96. As blade 12 rotates, each of bearings 88, 92, 96 rotates about its associated axial pin 70, 42, 44. Blade 12 is moved with an "index finger" which is part of the Akemat machine.

Both large and small diameter blades can be accommodated by the manner in which mount 16 is mounted on rods 11, 13. For illustrative purposes, the following description assumes that a blade 12 is processed at the right side of each of the pages of FIGS. 1–5. Large diameter blades are accommodated when mount 16 is mounted such that nose 26 points toward the left side of the page (away from the processing side), as shown in FIGS. 1–4 and 6. In such a configuration, rod 11 is positioned in angled recess or channel 108 and rod 13 is positioned under bottom 102 of mount 16, as shown in FIG. 6. Such a configuration requires fastener 104 to engage bored hole 110, which can be seen in FIG. 4. The offset alignment is required by the Akemat machine in order to have proper processing.

Figure 5:
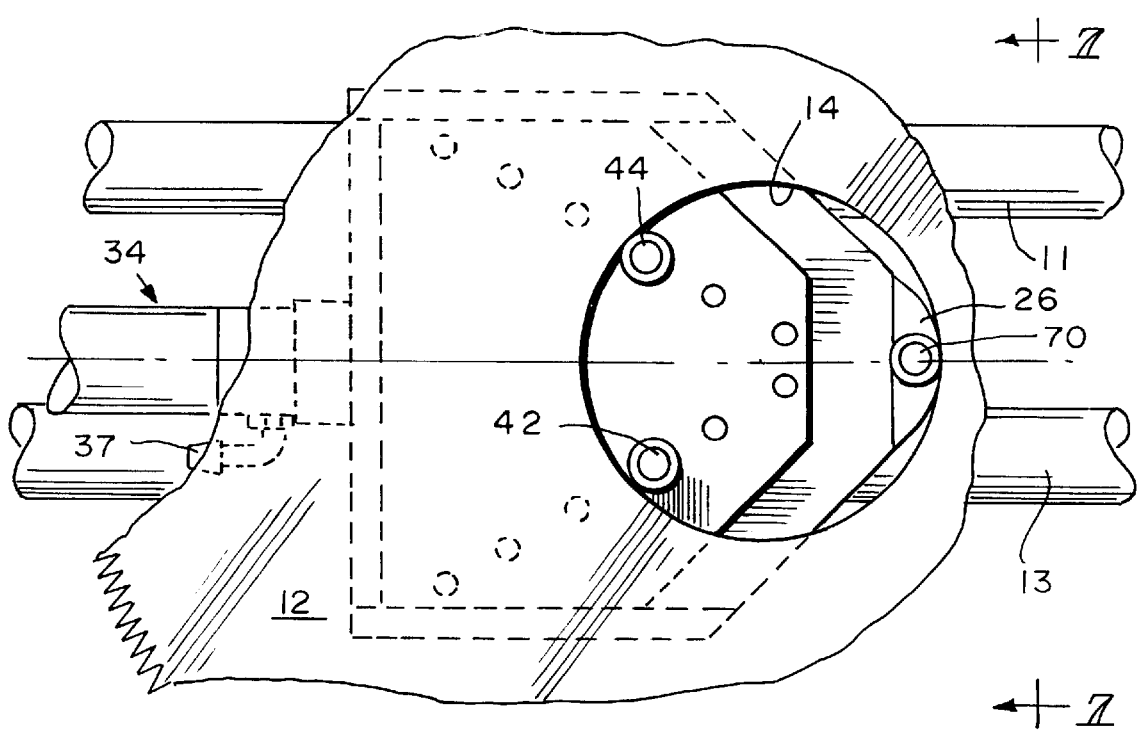
FIG. 5 is a top view similar to that of FIG. 3, showing the centering device turned 180 degrees to accommodate a differently sized blade.

Smaller diameter blades can be accommodated by mounting mount 16 such that nose 26 points toward the right side of the page (toward the processing side), as shown in FIGS. 5 and 7. When nose 26 is turned toward the processing side, fastener 104 is threaded into bored hole 112, which can be seen in FIG. 4, in order to accommodate the alignment required by the illustrative Akemat machine. Furthermore, in order to hold mount 16 in alignment, rod 13 is positioned in angled recess 109 and rod 11 is positioned under bottom 102.

Although the present invention has been described with reference to particular means, materials and embodiments, from the foregoing description, one skilled in the art can easily ascertain the essential characteristics of the present invention and various changes and modifications may be made to adapt the various uses and characteristics without departing from the spirit and scope of the present invention as set forth in the following claims.

What is claimed is:

1. A device for centering a circular cutting tool on a machine, the tool having a bore, the device comprising:
    a mount adapted to be attached to the machine;
    a slide coupled to the mount and configured for movement relative to the mount, the slide and mount cooperating to support the tool and to present the tool to a processing element;
    a first bearing mounted on the mount; and
    a second and a third bearing mounted on the slide for movement with the slide selectively toward and away from the first bearing so that the first, second and third bearings are engagable with the bore of the tool and the tool is centered on the machine when the second and third bearings are moved from the first bearing securely pulling the tool bore against the first, second and third bearings, whereby the tool is then rotatable about its center axis.

2. The device of claim 1, further comprising a second pin and a third pin for carrying the second and third bearings, respectively, wherein the slide is configured to include a plurality of holes, each hole being configured to receive one of the second pin and the third pin.

3. The device of claim 2, wherein the slide is configured to be moved either a first direction or a second, opposite direction relative to the mount and the plurality of holes is arranged on the slide along a first line and a second line.

4. The device of claim 3, wherein the first line and the second line are disposed at angles relative to the first direction.

5. The device of claim 4, wherein the slide has a first end closest to the first bearing mounted on the mount, and the plurality of holes is arranged such that the first line is closest to the second line near the first end of the slide.

6. The device of claim 3, wherein each hole disposed along the first line has an equal and opposite hole disposed along the second line.

7. The device of claim 1, further comprising an adjuster configured to move the slide selectively toward and away from the first bearing mounted on the mount.

8. The device of claim 7, wherein the adjuster is a pneumatically driven piston.

9. The device of claim 1, wherein the mount has a channel configured to support the slide for sliding movement therein.

10. The device of claim 1, wherein the mount has a tool-engaging surface and the slide has a tool-engaging surface, the tool-engaging surfaces of the mount and slide being disposed in substantially the same plane.

11. The device of claim 10, wherein the first, second, and third bearings each define an axis perpendicular to that defined by the tool-engaging surfaces of the mount and slide.

12. The device of claim 11, wherein the second and third bearing axes are positioned to lie in a plane that is substantially perpendicular to a plane defined by the axis of the first bearing and a centerpoint between the second and third bearing axes.

13. A method of centering a tool on a machine, the tool having a bore, comprising the steps of:
    providing a mount having a bearing, the mount being configured for coupling with the machine,
    providing a slide having a first row and a second row of holes, the slide being configured to move relative to the mount,
    positioning the tool on the mount and slide such that the bore engages the bearing and at least one hole from each row of holes is visible through the bore,
    placing a pin carrying a second bearing in an outermost visible hole of the first row,
    placing a pin carrying a third bearing in an outermost visible hole of the second row, and
    moving the slide relative to the mount such that the first, second, and third bearings engage and hold the bore of the tool.

14. The method of claim 13, wherein the slide-moving step includes the steps of providing a pneumatically driven piston coupled between the slide and the mount and directing one of a positive and a negative pneumatic pressure to the piston.

15. A device for centering a circular cutting tool on a machine, the tool having a bore, the device comprising:
    a mount adapted to mount on the machine;
    a slide coupled to the mount and configured for movement relative to the mount, the slide and mount cooperating to support the tool and to present the tool to a processing element;

a first bearing mounted on the mount; and a second bearing mounted on the slide for movement with the slide selectively toward and away from the first bearing so that the first and second bearings are engagable with the bore of the tool and the tool is centered on the machine when the second bearing is moved away from the first bearing, thereby positioning the tool bore against the first and second, whereby the tool is then rotatable about its center axis.

16. The device of claim 15, wherein the machine comprises a first rod and a second rod parallel to the first rod, and the mount is configured to be mounted offcenter from the first and second rod.

17. The device of claim 16, wherein the mount is configured such that it can be oriented relative to the first and second rods in one of two opposite directions.

* * * * *